United States Patent [19]

Sakamoto

[11] 4,404,601

[45] Sep. 13, 1983

[54] HEAD TRACKING CONTROL SYSTEM

[75] Inventor: Hitoshi Sakamoto, Tokyo, Japan

[73] Assignee: Sony Corporation, Tokyo, Japan

[21] Appl. No.: 232,014

[22] Filed: Feb. 6, 1981

[30] Foreign Application Priority Data

Feb. 16, 1980 [JP] Japan .................................. 55-18371

[51] Int. Cl.³ ............................................ H04N 5/783
[52] U.S. Cl. ...................................... 360/10.3; 360/77
[58] Field of Search ..................... 360/10.2, 10.3, 38.1, 360/77; 358/312, 314, 324, 325, 326

[56] References Cited

U.S. PATENT DOCUMENTS

| 4,215,362 | 7/1980 | Ravizza .............................. 360/77 X |
| 4,257,073 | 3/1981 | Tatami .................................. 360/10.3 |
| 4,268,874 | 5/1981 | Yamagiwa et al. ................. 360/10.3 |
| 4,268,875 | 5/1981 | Morio et al. ........................ 360/10.3 |
| 4,287,538 | 9/1981 | Sakamoto et al. ................. 360/10.2 |
| 4,293,879 | 10/1981 | Heitmann et al. ................. 360/10.3 |

FOREIGN PATENT DOCUMENTS

| 55-44211 | 3/1980 | Japan ................................... 360/10.3 |
| 55-44215 | 3/1980 | Japan ................................... 360/10.3 |

Primary Examiner—Bernard Konick
Assistant Examiner—Donald McElheny, Jr.
Attorney, Agent, or Firm—Lewis H. Eslinger; Alvin Sinderbrand

[57] ABSTRACT

A video tape recording/reproducing apparatus for reproducing video signals recorded in successive parallel tracks on a magnetic tape includes a magnetic head for scanning the tracks to reproduce signals recorded therein; a bi-morph leaf for deflecting the head in a direction transverse to the direction along the tracks; a synchronizing signal forming circuit for producing substitute vertical synchronizing signals having correct vertical phase continuity for any of different reproducing modes, regardless of any phase discontinuity in the reproduced vertical synchronizing signals included with the video signals, the substitute vertical synchronizing signals being produced in response to either the reproduced vertical synchronizing signals or a speed ratio signal corresponding to the ratio of the speed of advancement of the tape in the reproducing mode to that in the recording mode, with the speed ratio signal being produced in response to the reproduced horizontal synchronizing signals included with the video signals; and a drive signal circuit for producing a drive signal which includes a head jump signal component and supplying the drive signal to the bi-morph leaf so as to control the latter to deflect the head to accurately scan the tracks, the drive signal circuit including a phase difference detecting circuit for producing a phase difference signal in response to the phase difference between the substitute vertical synchronizing signals and a reference vertical synchronizing signal, and a jump signal forming circuit producing the head jump signal component in response to the phase difference signal and the speed ratio signal.

25 Claims, 9 Drawing Figures

HEAD TRACKING CONTROL SYSTEM

BACKGROUND OF THE INVENTION

1. Field of the Invention

This invention relates generally to apparatus, such as a video tape recorder (VTR) of the so-called "helical-scan type", in which video or other information signals are recorded in successive parallel tracks which are skewed or extend obliquely on a magnetic tape and, more particularly, is directed to an improved tracking control system by which a magnetic head or other transducer in such apparatus is made to accurately scan the track or tracks in which the video or other information signals are recorded.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During the recording operation of the VTR, the angle between the scanning path, and hence each record track, and the longitudinal direction of the tape is dependent on the rotational speed of the rotary head and also the speed at which the magnetic tape is longitudinally advanced. Accordingly, if the speed and direction of advancement of the magnetic tape are not the same during the reproducing operation as during the recording operation, then the scanning path of the magnetic head during reproducing will not precisely follow or coincide with a record track on the tape during each movement of the head across the tape and, accordingly, the recorded video or other information signals may not be correctly or accurately reproduced.

Various tracking control or servo systems have been proposed for maintaining correct tracking or scanning of the record tracks by the rotary head. In the most desirable of these known arrangements, means are provided for deflecting the head in a direction normal to the plane of its rotation, that is, in a direction which is transverse in respect to the direction along each of the record tracks, and the amount of such deflection is electrically controlled during the movement of the head along each track so as to achieve accurate scanning of the latter. In published Japanese Patent Application No. 9919/1974 (Applicant: Matsushita Electric Industrial Company, Limited), it is generally disclosed to control the amount of deflection of the head in the direction normal to its plane of rotation in dependence on the difference between the speeds of advancement of the tape during the recording and reproducing operations so as to theoretically make possible the correct reproduction of the recorded video signals in the still-motion mode in which the tape is at rest, in the slow-motion mode in which the speed of advancement of the tape is, for example, ¼ or ½ the tape speed for the recording operation, and in the quick-motion mode in which the speed of advancement of the tape is substantially greater than, for example, 2 times, the tape speed, for the recording operation. Further, in published Japanese Patent Application No. 117,106/1977 (Applicant: Ampex Corporation), it is disclosed to detect the amount of deflection of the head required for accurately scanning a record track thereby, and, when the detected deflection approaches the physical limit of that possible with the bi-morph leaf or other transducer deflecting device supporting the head, the electrical drive signal for the bi-morph leaf is controlled to cause the head to scan the next adjacent record track, that is, to effect a so-called "track jump". By reason of such "track jump" it is theoretically possible to effect correct slow-motion reproduction and also reverse-motion reproduction in which, for example, the tape is advanced longitudinally at the same speed as for the recording operation, but in the reverse or opposite direction.

However, in many existing tracking control or servo systems, the amplitude of the deflection of the rotary head or transducer by its transducer deflecting device is not optimized, that is, the maximum required deflection of the head in the non-normal reproduction modes, for example, the still-motion, slow-motion, fast-forward and reverse-motion modes, is not minimized. The foregoing tends to limit the permissible tape speed for reproducing in the fast-forward and reverse-motion modes, and to cause phase deviations or errors in the reproduced signals. Further, the failure to optimize the amplitude of the deflection of the rotary head or transducer by the bi-morph leaf or other transducer deflecting device disadvantageously decreases the durability of the transducer deflecting device and the speed and linearity of its response to the electrical drive or control signal therefor. Moreover, a circuit of undesirably large capacity is required for providing the electrical drive signal to the transducer deflecting device when the deflection amplitude is not optimized.

In U.S. Patent Applications Ser. Nos. 06/073,246 and 06/152,117, filed Sept. 6, 1979 and May 21, 1980, respectively, which have matured into U.S. Pat. Nos. 4,287,538 and 4,361,857, respectively, and both having a common assignee herewith, there is disclosed an automatic tracking control system which optimizes the amplitude of the deflection of the rotary head by its deflecting device for each of the non-normal reproducing modes. More particularly, in the foregoing automatic tracking control systems, the drive signal applied to the transducer deflecting device comprises a head position and track selection control signal for determining the starting position of the transducer or head and, thereby, the next desired track to be followed or scanned thereby, a dithering signal or oscillation, and a track following error signal.

With a helical scan VTR, vertical synchronizing signals are recorded, for example, at the end of each track on the tape, so that each vertical synchronizing signal corresponds to one of the record tracks extending obliquely on the tape. The vertical synchronizing signals are compared with external reference signals obtained from rotation of the guide drum in the aforementioned commonly assigned applications to provide the head position and track selection control signal. However, the situation may occur where one or more vertical synchronizing signals are dropped out or generated at an early or later time, for example, due to tape tension variation or damage of the tape itself. During reproduction in the normal reproducing mode, such dropping out or variation in the vertical synchronizing signals does not adversely affect the reproduced picture. This is because an external reference vertical synchronizing signal can be substituted for the dropped out vertical synchronizing signal so that proper processing of the video signals by a time base correcting circuit can occur.

A problem occurs, however, during the special reproducing modes, such as the slow-motion, still-motion and quick-motion modes. In such case, the reproducing transducer or head does not always follow successive record tracks on the magnetic tape. Instead, the reproducing head is caused to jump, that is, skip over, one or more record tracks in the quick-motion mode, and to reproduce the same track one or more times in the still-motion and slow-motion modes. In such case, the vertical phase of the field corresponding to a track being reproduced varies in accordance with the amount and direction of the head jump. Accordingly, if a vertical synchronizing signal is dropped out during reproduction in a special mode, a problem occurs with specifying the vertical phase of the field corresponding to the track then being reproduced, resulting in a loss in continuity of the vertical phase of the reproduced video signal. This results in problems in the operation of the time base correcting circuit with a consequent deterioration in the reproduced picture.

OBJECTS AND SUMMARY OF THE INVENTION

Accordingly, it is an object of this invention to provide an apparatus for reproducing information signals recorded in successive parallel tracks on a record medium with an improved tracking control system which avoids the above-described problems associated with the prior art.

More particularly, it is an object of this invention to provide a tracking control system, as aforesaid, by which information signals recorded in successive parallel tracks on a record medium can be correctly reproduced in the various non-normal reproducing modes, regardless of dropouts or time variations in the reproduced vertical synchronizing signals.

Another object of this invention is to provide a tracking control system, as aforesaid, in which substitute vertical synchronizing signals are formed and used to produce the required drive signal for the bi-morph leaf, with the substitute vertical synchronizing signals having substantially correct vertical phase continuity in all reproducing modes regardless of the phase discontinuities in the reproduced vertical synchronizing signals.

In accordance with an aspect of this invention, apparatus is provided for reproducing information signals recorded in successive parallel tracks on a record medium in any of a plurality of different reproducing modes, with the information signals including vertical synchronizing signals also recorded on said record medium, and the apparatus including transducer means movable in a direction along the tracks for reproducing the signals recorded therein; transducer deflecting means for deflecting the transducer means in a direction transverse to the direction along the tracks; synchronizing signal forming means for producing substitute vertical synchronizing signals having correct vertical phase continuity for each of the plurality of different reproducing modes, regardless of any phase discontinuity in the recorded vertical synchronizing signals as reproduced; and drive signal means for producing a drive signal in response to at least the substitute vertical synchronizing signals and for supplying the drive signal to the transducer deflecting means so as to control the latter to deflect the transducer means to accurately move along the tracks.

In accordance with a preferred embodiment of this invention, the drive signal means includes a circuit for producing a slant compensation signal as part of the drive signal to correct any inclination tracking error of the transducer means, a jump signal forming circuit for producing a head jump signal as part of the drive signal to produce a head jump at selected times, a tracking error circuit for producing a tracking error signal as part of the drive signal to correct deviation of the head trace from the track to be scanned, and an oscillation circuit for producing a dithering signal as part of the drive signal. The synchronizing signal forming means produces the substitute vertical synchronizing signals in response to the horizontal synchronizing signals in the information signals when a vertical phase discontinuity is present in the reproduced vertical synchronizing signals and in response to the reproduced vertical synchronizing signals when no vertical phase discontinuity is present therein. The substitute vertical synchronizing signals are then used to produce the head jump signal.

The above, and other, objects, features and advantages of the invention, will be apparent in the following detailed description of illustrative embodiments thereof which is to be read in connection with the accompanying drawings.

DETAILED DESCRIPTION OF THE PREFERRED EMBODIMENTS

Figure 1:
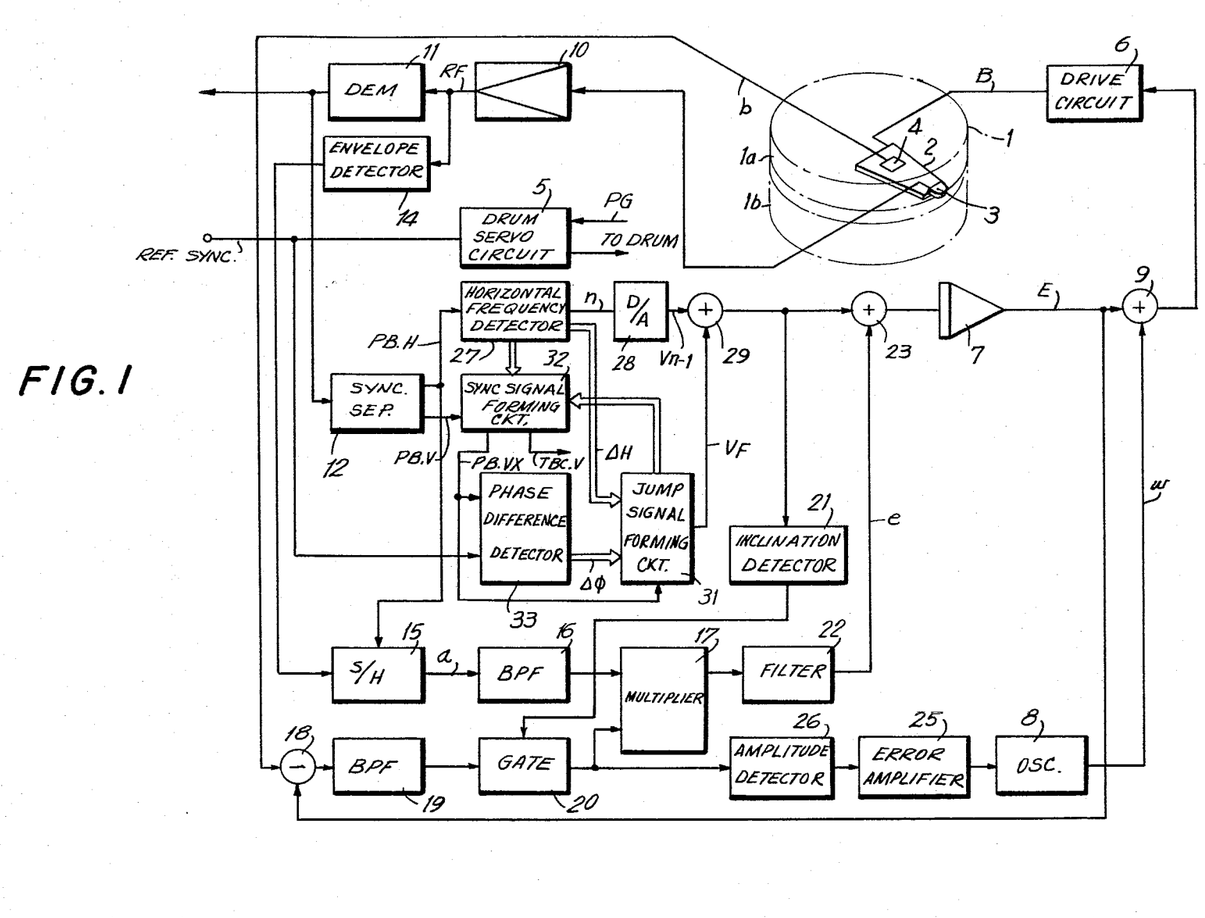
FIG. 1 is a block diagram of a head tracking control circuit according to one embodiment of this invention.

Referring to the drawings in detail, and initially to FIG. 1 thereof, there is shown therein a rotary head drum assembly of a known one-head VTR of the helical-scan type. The rotary head drum assembly is shown to include an upper rotary drum $1a$ which is rotated by a drive shaft (not shown) and a lower stationary drum $1b$ which is fixed on a chassis of the VTR concentric with the drive shaft so as to be opposite upper drum $1a$ with a small gap therebetween. A magnetic head 3 is attached on the lower surface of upper drum $1a$ through a bi-morph leaf 2, that is, an electromechanical transducer formed of piezo-electric elements. Head 3 rotates with upper drum 1a at a predetermined rotational speed and is deflected perpendicularly to its scanning path, or transversely with respect to the longitudinal direction of each record track, by means of the bi-morph leaf 2.

Figure 5:
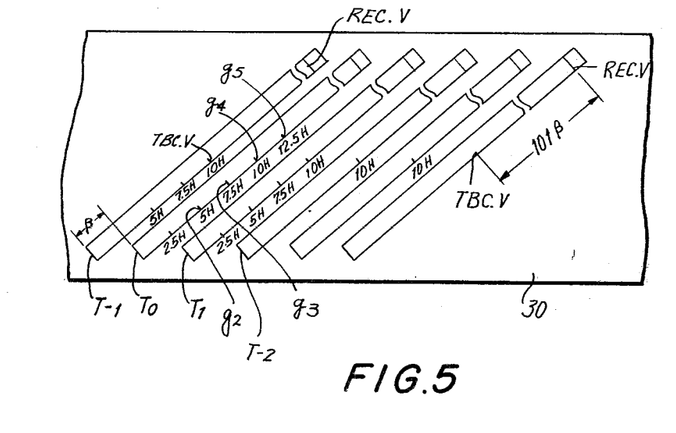
FIG. 5 is a schematic diagram of a portion of a magnetic tape illustrating a pattern of record tracks extending obliquely on the tape.

A magnetic tape 30 (FIG. 5) is wrapped helically around the outer peripheries of upper drum 1a and lower drum 1b over an arc of almost 360°, as specifically shown in the aforementioned U.S. Patent Applications Ser. Nos. 06/073,246 (U.S. Pat. No. 4,287,538) and 06/152,117 (U.S. Pat. No. 4,361,857), the entire disclosure of such applications being incorporated herein by reference. During the recording operation, the tape is advanced longitudinally at a predetermined speed, so that video or other information signals are recorded by head 3 in a series of parallel magnetic tracks T at a predetermined slant angle to the longitudinal direction of the tape 30, as shown in FIG. 5.

Figure 2:
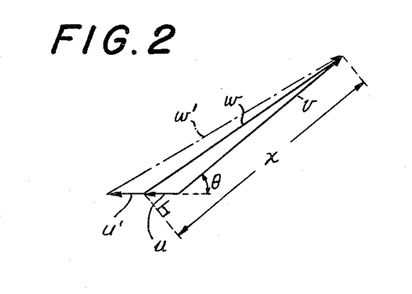
FIG. 2 is a vector diagram illustrating the relationship between movement of the magnetic tape and movement of the magnetic head.

In the playback or reproducing operation with the tape being transported at the recording speed, an accurate video signal can be reproduced with a tracking servo system which includes a drum servo and/or capstan servo for adjusting the rotary phase of the head 3 so as to make the head correctly trace or scan the successive record tracks. In a playback mode employing an arbitrary tape speed which is different from the recording speed, both the phase and slant angle of the head scanning path do not coincide with the phase and slant angle, respectively, of the recorded track T. For example, the vector representation $\omega$ of the relative scanning velocity of head 3 on the magnetic tape, and therefore of the direction in which a record track is formed, is shown in FIG. 2, with the length $X = v + u \cos \theta$ thereof representing the head speed on the magnetic tape during the recording mode, where u is the vector representation of movement of the magnetic tape, v is the vector representation of movement of head 3, and $\theta$ is the angle of inclination between the magnetic tape and guide drum 1. During reproduction at a different tape speed u' than in the recording mode, head 3 scans the tape with a different relative scanning velocity w', shown as a dot-dash line in FIG. 2, and which is different in length and inclination from vector w. It should be appreciated that vector w' is also representative of the direction in which the head scans the tape.

Therefore, in the arbitrary speed playback mode, the vertical position of head 3 must be changed by deflection of bi-morph leaf 2 in response to a control or drive signal so as to achieve initial phase error compensation and slant tracking error compensation, whereby vector w' becomes aligned with vector w. In addition to such compensations, it is necessary to effect tracing track selecting in order to perform overlap-tracing or interval-tracing. Overlap-tracing is required in a slow-motion playback mode employing a tape speed slower than the recording speed, and in which the head repeatedly traces or scans a recorded track and then the head scans the next track on the tape. Interval-tracing or skip-tracing is required in a fast-motion playback mode employing a tape speed faster than the recording speed, and in which one or several tracks are skipped and the head only scans the tracks at intervals. Thus, when compensating for phase and slant errors, the optimum one of the recorded tracks must be traced to correctly effect such overlap-tracing or interval-tracing while ensuring that the vertical position of the head will not go beyond the smallest possible maximum permissible deflection for the tracking operation. The alteration of the head from the track being traced to the next desired one in the overlap-tracing or interval-tracing mode is hereinafter called "track jump" or "flyback", and the minimum track jump is equal to one pitch of the recorded tracks.

Next, the condition for track jump, that is, the optimum condition to minimize the amplitude of head deflection or deviation, will be considered.

As noted above, tracking error compensation includes both a phase error compensation and a slant error compensation. In respect to the phase error compensation, when the head 3 is going to scan a path which is not parallel to the tracks on FIG. 5, a maximum deflection of $\pm \frac{1}{2}$ pitch (one pitch is equal to the distance between adjacent record tracks) is the most that may be required to move the head onto the starting point of a recorded track to be traced from its tracing path. In other words, when the head is centered between adjacent tracks at the start of its scanning movement, the phase error is maximum and may be corrected by a $\pm \frac{1}{2}$ pitch deflection. If the arrangement is such that the head can be deflected to both sides of a track T by bi-morph leaf 3 which is controlled to selectively bend upward and downward from its neutral position, a head deflection amplitude of one pitch, in its peak to peak value, is necessary for effecting the phase compensation irrespective of the tape speed during reproducing.

On the other hand, the slant compensation required to ensure that, once the head begins to trace a desired track, it will trace that one track from beginning to end, will vary in accordance with the tape speed. When the ratio of playback tape speed to the recording speed is represented by n, the required slant compensation is as follows:

$$(n - 1) \text{ pitch (in the case of } n \geqq 1) \quad (1)$$

or $$(1 - n) \text{ pitch (in the case of } n < 1) \quad (2)$$

Consequently, a phase compensation of 1 pitch and a slant compensation of (n-1) pitches may be required for correction of the scanning path of the head. Since the phase compensation has no relation to the playback tape speed, the phase and slant compensations are independent of each other. Thus, the necessary maximum amplitude P of the head deflection is represented by the sum of the compensation components as follows:

$$P = [(n - 1) + 1] \text{ pitch for } n \geqq 1 \quad (3a)$$

$$P = [(1 - n) + 1] \text{ pitch for } n < 1 \quad (3b)$$

Figure 4:
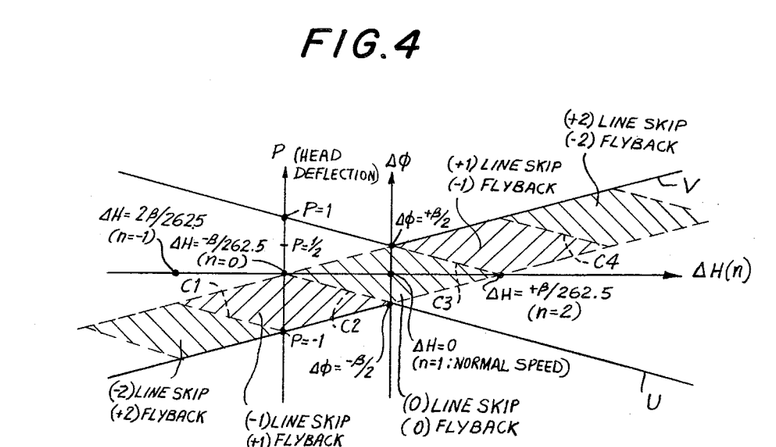
FIG. 4 is a graphical diagram showing a group of boundary lines for determining the head jump or flyback condition.

FIG. 4 shows the range of necessary maximum head deflections deduced from equations (3a) and (3b). As is apparent from FIG. 4, since the bi-morph leaf 2 is equally deflectable in the upward and downward directions, the deflection amplitude P of equations (3a) and (3b) may be equally distributed between an upper range and a lower range at opposite sides of a base surface (corresponding to the abscissa of FIG. 4) on which bi-morph leaf 2 supporting the head is mounted. The upper boundary line V and the lower boundary line U of the range are represented by:

$$P = \pm \frac{1}{2} [(n - 1) + 1] \text{ for } n \geqq 1 \quad (4a)$$

or

-continued $$P = \pm \frac{1}{2}[(1-n)+1] \text{ for } n < 1 \quad (4b)$$

The optimum deflection is achieved by bending bi-morph leaf 2 in the range defined between the upper and lower boundary lines V and U. The foregoing is a necessary condition to reduce the required deflecton amplitude of the bi-morph leaf to the absolute minimum.

A method of controlling the track jump, which satisfies the necessary conditions of FIG. 4, will now be considered.

When the playback speed ratio n is an integer, interval-tracing, in which one or several recorded tracks are skipped, is effected with a track jump of n-pitches after each tracing or scan of a track. For example, in (2/1)—fast-motion reproduction, tracing at intervals of 2-pitches or on alternate tracks is effected. Accordingly, when the playback speed ratio n is an integer, the "track jump pitch" or "trace pitch", that is, the distance between adjacent tracking tracks, may be represented by n-pitches. However, when the speed ratio n is not an integer, for instance, if n is equal to 1 divided by an integer, one of the recorded tracks is repeatedly traced n-times, and then a track jump of one pitch, that is, to the next track, is effected. Therefore, when the speed ratio n is not an integer, the "track jump pitch" cannot be represented by n.

Since the head is not allowed to jump from one track to another in the middle of tracing or scanning a track, the track jump pitch is always an integral multiple of one pitch. Accordingly, when the speed ratio n is not an integer, n must be represented by two integers l and m as follows:

$$n = \frac{l \times X + m \times y}{X + y} \quad (5)$$

where l and m are determined by the inequality $(n+1) < l < n < m < (n-1)$ and X and y are appropriate integers. The following table shows values of l and m obtained from equation (5) for various ranges of n:

TABLE

VALUES OF l AND m FOR VARIABLE n

| | | |
|---|---|---|
| 1 > n > 0 | l = 1 | m = 0 |
| 2 > n > 1 | l = 2 | m = 1 |
| 3 > n > 2 | l = 3 | m = 2 |
| 0 > n > −1 | l = 0 | m = −1 |
| −1 > n > −2 | l = −1 | m = −2 |

The numbers l and m represent the necessary track jump pitches and X and y represent the number of times the jumps of pitches l and m are respectively effected. The combination of the track jumps of pitches l and m carried out X—times and y—times, respectively, in each unit trace mode, serves to provide a track jump of n-pitches on the average, and thereby achieves playback at the speed ratio n.

For example, when n is equal to 2.25 for the 2.25/1-fast-motion playback mode, l=3, m=2, X=1 and y=3. In that case, each cycle of the tracking operation involves a single track jump of 3-pitches and then, a track jump of 2-pitches which is repeated 3-times. In this case, each cycle of the tracking operation achieves a total track jump of 9-pitches in 4-track jumps leading to an "average" track jump of 2.25 pitches.

Therefore, in the arbitrary speed playback, predetermined numbers of track jumps of l pitches and m pitches are carried out to achieve the desired tracking operation. In certain particular cases, when the playback speed ratio n is not an integer or $|n| < 1$, l or m becomes zero. The actual amounts of head deflection needed to effect the track jumps of l pitches and m pitches are l−1=m pitches and m−1 pitches, respectively, as the head jumps from the concluding end of a track being scanned to the starting end of a next track to be scanned, and the vertical positions of the concluding and starting ends of adjacent recorded tracks agree with each other on the peripheral surface of the head drum assembly. In other words, in the absence of any deflection of the head by its supporting bi-morph leaf, a so-called track jump of 1-pitch is effected as the head moves from the concluding end of one track to the starting end of the next track.

The head deflections of l−1 =m pitches and m−1 pitches are hereinafter called an "m-jump" and "(m−1)−jump", respectively. The larger one of the m-jump and (m−1)−jump, considered in absolute values thereof, is referred to as the "large jump" and the smaller one is referred to as the "small jump", from which it follows that the m-jump is the large jump in the case of n>1 and the (m−1)-jump is the large jump in the case of n<1.

Detailed consideration is given to the sequence or condition of the track jumps needed to maintain deflection of the head within the range shown in FIG. 4 in the aforementioned U.S. Patent Application Ser. No. 06/073,246 (U.S. Pat. No. 4,287,538), the disclosure of which is incorporated herein, as previously stated. Generally, after a large jump or small jump is carried out to move the head onto the beginning or starting end of a desired recorded track, the head scans such track while the slant compensation of $|n-1|$ pitches is effected. The deflections of the bi-morph leaf for the track jump and the slant compensation are carried out in opposite directions from each other. For example, when the small jump is carried out, the deflection is equal to (m−1) pitches, in the case of n>1. If the slant compensation of (n−1) pitches is effected after the small jump and the head is positioned at a point P before the small jump, the head is deflected by the small jump and the following tracing to the point:

$$P' = P - (m-1) + (n-1) \quad (6)$$

which must be below the line V (FIG. 4). It should be appreciated that when P' is above the upper boundary line V, the large jump (m) should be carried out and when below the boundary line, only the small jump (m−1) should be carried out. Thus, substituting the upper boundary line $V(P' = \frac{1}{2} n)$ into equation (6) under the condition that the final position of the head is below the upper boundary line, the following inequality is obtained:

$$P - m + n < \text{line } V \text{ or } P - m + n < \frac{1}{2} n \quad (7)$$

so that, $$P < -\frac{1}{2} n + m. \quad (8)$$

The above inequality (8) gives the condition necessary for the small jump in the case of n>1. If it is assumed that the final position of the head is above the upper boundary line V, the following inequality is obtained:

$$P > -\frac{1}{2}n + m \quad (9)$$

As a result, a group of boundary lines defining the conditions for changeover between the large jump and the small jump are expressed as follows:

$$P = -\frac{1}{2}n + m \quad (10)$$

where m is an integer given by the condition of n≧m≧n−1. In other words, if inequality (8) is satisfied, a small jump (m−1) is effected and if inequality (9) is satisfied, a large jump (m) is effected. The same holds true for n<1 and a similar analysis can be made. Generally, the tape speed ratio n and the head deflection P for judging the flyback condition of equation (9) are obtained from the variation ΔH of the reproduced horizontal sync signal and the phase variation Δφ of the reproduced vertical synchronizing signal. The boundary lines for determining the jump condition are shown by dotted lines $C_1$, $C_2$, $C_3$, $C_4$ . . . in FIG. 4, and the significance of such lines is more clearly described in the aforementioned U.S. Patent Application Ser. No. 06/073,246 (U.S. Pat. No. 4,287,538). Basically, the boundary lines $C_1$, $C_2$, $C_3$, $C_4$ . . . in FIG. 4 define the boundaries for determining whether a large jump or a small jump is next required. Thus, when the head deflection position P', after head 3 completes its tracing of a track, lies within one of the hatched areas defined by dotted lines $C_1$, $C_2$, $C_3$, $C_4$. . . , a suitable "head jump" or "flyback" is effected.

The deflections of the head by m pitches and (m−1) pitches, respectively, for the large jump and the small jump are shown on FIG. 4 as "flyback" amplitudes in terms of the respective numbers of pitches with a positive or negative sign attached to each in respective diamond-shaped regions. The positive and negative signs represent the direction of the flyback movement of the head. The positive sign indicates that the bi-morph leaf 2 in FIG. 1 is bent or deflected upward by the prescribed number of pitches and the negative sign indicates that the bi-morph leaf 2 is bent downward by the prescribed number of pitches. "(0) flyback" means that the track jump to reset the head onto the beginning of the next desired track is performed without any flyback movement or deflection of the bi-morph leaf but automatically with the tape running.

A head tracking control circuit which performs the above-described tracking operation will now be described with reference to FIG. 1.

Generally, bi-morph leaf 2 is deflected by a drive or output voltage B supplied thereto from a drive circuit 6. The signal supplied to drive circuit 6 includes a tracking signal E comprised of a slant or inclination compensation signal $V_{n-1}$, a jump voltage signal $V_F$ and a tracking error signal e, and which is combined with a dithering or wobbling signal w. In this manner, bi-morph leaf 2 is deflected in accordance with the output of drive circuit 6 to control the position of magnetic head 3 so as to accurately trace the record tracks extending obliquely on magnetic tape 30 (FIG. 5).

The wobbling or dithering signal w has a frequency $f_0$, for example, $f_0 = 1.5$ KHz, so that as magnetic head 3 accurately scans each of the record tracks, it is wobbled transversely with respect to the longitudinal direction of the record track at the frequency $f_0$. As a result, the RF or FM signal reproduced by head 3 is subjected to amplitude modulation at the wobbling or dithering frequency $f_0$. The reproduced RF signal from head 3 is fed to a demodulator 11 through a reproducing amplifier 10, the output of the demodulator 11, in turn, being fed to a video signal reproducing system (not shown) and further to a synchronizing signal separating circuit 12. The latter circuit separates the horizontal synchronizing signals PB.H. and vertical synchronizing signals PB.V from the reproduced video signal.

The reproduced RF signal from reproducing amplifier 10 is further supplied to an envelope detecting circuit 14, from which an amplitude-modulation component (envelope signal) included in the RF signal is obtained. The output of detecting circuit 14 includes information regarding the amount and direction of the tracking error of the actual scanning path relative to the recorded track. The output of detecting circuit 14 is supplied to a sample and hold circuit 15 which receives the horizontal synchronizing signals PB.H from synchronizing signal separating circuit 12. Thus, circuit 15 samples the output of envelope detecting circuit 15 at each horizontal synchronizing signal and holds the samples value until the receipt of the next horizontal synchronizing signal. It should be appreciated that, since the output of reproducing amplifier 10 is a frequency modulated (FM) wave, in recording/reproducing systems having a frequency gain characteristic, the FM wave is subjected to an amplitude modulation in accordance with the content of the picture, that is, the brightness signal. However, since the envelope signal from detecting circuit 14 is sampled and held by sample and hold circuit 15 in response to each horizontal synchronizing signal, the amplitude-modulation component a which is not affected by the content of the picture is obtained from circuit 15. The value sampled by circuit 15 is supplied to one input of a multiplier circuit 17 through a band-pass filter 35, the latter circuit functioning to pass the side-band component at the central frequency $f_0$, in addition to tracking error information.

In addition, a strain gauge 4, preferably a resistive wire strain gauge, is mounted to the surface of bi-morph leaf 2 so as to detect the deflectin of bi-morph leaf 2 and accordingly, of magnetic head 3. The output b of strain gauge 4 is supplied to another input of multiplier circuit 37 through a band-pass filter 19 and a gate circuit 20. Output signal b of strain gauge 4 corresponds substantially to the drive voltage B for bi-morph leaf 2 but also includes amplitude-modulated components due to undesirable mechanical vibrations, such as resonant and transient vibrations, for example, due to head jump. Accordingly, a subtracting circuit 18 is provided between strain gauge 4 and band-pass filter 19 in which the tracking signal E, prior to its addition to dithering signal w, is subtracted from output signal b of strain gauge 4 so that the signal supplied to multiplier circuit 17 corresponds to the amplitude-modulated RF signal from envelope detecting circuit 14. The output of subtracting circuit 18 is then supplied to band-pass filter 19, the central frequency of which corresponds to the wobbling or dithering frequency $f_0$ of bi-morph leaf 2.

Further, it should be appreciated that during the head jump period, a track is not scanned by head 3 and accordingly, no tracking error information is obtained.

Accordingly, the output of band-pass filter 19 is supplied to multiplier circuit 17 through gate circuit 20 which is operated in response to an appropriate gate signal, as will hereinafter be described, to prevent any signal from being supplied to multiplier circuit 17 during the head jump period. However, during the track scanning operation, gate circuit 20 supplies the output b from strain gauge 4, as modified in subtraction circuit 18 and band-pass filter 19 to one input of multiplier circuit 17.

Accordingly, the deflection detecting signal b from strain gauge 4 is multiplied by the envelope signal a in multiplier circuit 17 which functions as a synchronous detector. The level and polarity of the output of multiplier circuit 17 corresponds to the amount and direction of deviation of head 3 from the track then being scanned and is hereinafter referred to as the tracking error signal e. This latter signal is supplied through a filter circuit 22 to an adder 23. Filter 22 functions as a trap filter for eliminating components having a frequency $2f_0$ which are generated in multiplier circuit 17.

The output of gate circuit 20 is further supplied to an amplitude detecting circuit 26 in which the amplitude of vibration or wobbling of bi-morph leaf 2 is detected. A DC voltage corresponding to the detected amplitude from amplitude detecting circuit 26 is compared with a reference voltage (not shown) in an error amplifier 25 and the error voltage therefrom is supplied to a controllable oscillator 8 so as to adjust the output level of the latter. Oscillation circuit 8, in turn, produces the dithering or wobbling signal w which is supplied to an adder 9. It should be appreciated that although the deflection sensitivity of bi-morph leaf 2 changes with temperature and aging, the amplitude of the forced vibration thereof is maintained constant so that any tracking error can easily be detected.

Figure 3:
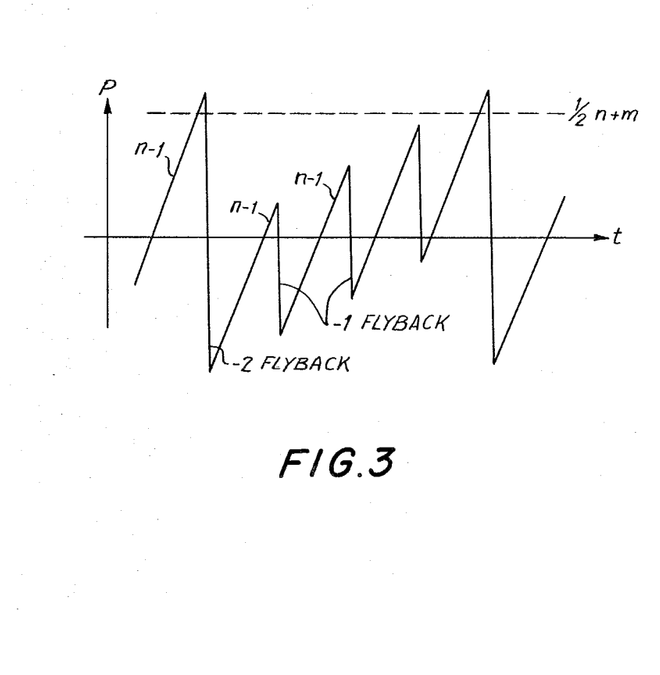
FIG. 3 is a waveform diagram of a drive voltage applied to a bi-morph leaf for head deflection in accordance with this invention.

Further, as previously discussed in regard to FIG. 2, during non-normal reproducing modes, the scanning by head 3 is askew with respect to the record track desired to be scanned. In other words, head 3 scans in the direction of vector w', shown by the dot-dash line in FIG. 2, rather than in the direction of the record track w. It is therefore necessary to supply a ramp or slant compensation voltage to bi-morph leaf 2 to correct any inclination error so as to align the vector w' with w. It has been found that, if the ratio of the tape reproducing speed to the tape recording speed is represented by n, the slant compensation signal for correcting the aforementioned inclination error is proportional to $|n-1|$, as previously discussed. Accordingly, the circuit of FIG. 1 includes a horizontal frequency detecting circuit 27 supplied with the horizontal synchronizing signals PB.H from synchronizing signal separating circuit 12 for producing a signal corresponding to the tape speed ratio n. This signal is supplied to a digital-to-analog (D/A) converter 28 which converts the speed ratio signal to a voltage signal $V_{n-1}$ which corresponds to the slant compensation factor or component $(n-1)$, and which is supplied through an adder 29 to adder 23 where it is combined with tracking error signal e from multiplier circuit 17. This is shown more particularly in FIG. 3 for the 2.25/1 fast reproducing mode in which the rising, positively sloped lines represent the waveform of the slant compensation drive voltage supplied to bi-morph leaf 2 and which are proportional to the slant compensation factor $(n-1)$. The downwardly sloping lines of the waveform connecting the slant compensation factor lines correspond to the "flyback" or "head jump", as will hereinafter be discussed. The ordinate of FIG. 3 represents the number of pitches P of the record tracks.

When the tracing or scanning of a recorded track is completed, a head flyback motion or reset motion is imparted to the bi-morph leaf 2 so as to reset the head to the beginning of the next desired track in accordance with the track jump condition. As will now be discussed, the amount of flyback, that is, the track jump condition, in accordance with equation (10), is determined as a function of the variation $\Delta H$ of the reproduced horizontal synchronizing signals PB.H and the phase variation $\Delta\phi$ of the reproduced vertical synchronizing signals PB.V.

Referring first to FIG. 5, there is shown a pattern of record tracks extending obliquely on a magnetic tape 30. It should be appreciated that, as a result of the skewed pattern of record tracks on tape 30, the start of each track is offset from its next adjacent track, in the longitudinal direction of the tracks, by a distance $\beta$. In other words, and in reference to FIG. 2, with the speed of head 3 along a track during the recording mode being equal to $X(=v+u\cos\theta)$, the relative head speed X, for example, in the still reproducing mode, is decreased by the factor $u\cos\theta$ in comparison with the speed for the normal reproducing mode. This decrease in speed corresponds to a decrease in tape length of $V\cdot u\cos\theta$ during each vertical scanning period, where V is representative of the time for one vertical scanning period. In other words, the decrease in tape length of $V\cdot u\cos\theta$ is equal to the distance $\beta$. Where $\beta$ is represented by a multiple of horizontal scanning periods, for example, 2.5 H, since there are 262.5 horizontal scanning periods in each track, the variation $\Delta H$ in the horizontal scanning period is equal to a time base error of $\beta/262.5$. It should be appreciated that the variation $\Delta H$ in the horizontal scanning period therefore corresponds to the tape speed ratio n. For example, when $n=1$ (normal reproducing mode), there is no variation in the horizontal scanning period so that $\Delta H=0$. However, when $n=0$ (still reproducing mode), there is a variation $\Delta H$ in the horizontal scanning period of $-\beta/262.5$, and when $n=2$ (fast forward reproducing mode), $\Delta H=+\beta/262.5$. This is shown more particularly in FIG. 4 for different values of n. It should therefore be appreciated that the output from horizontal frequency detecting circuit 27 corresponds to the tape speed ratio n and therefore, to the variation $\Delta H$ in the horizontal scanning period.

Further, the rotational phase of upper rotary drum 1a is controlled by a reference vertical synchronizing signal REF. SYNC from a drum servo circuit 5. When head 3 is not deflected by bi-morph leaf 2 in the normal reproducing mode, the phase of the reproduced vertical synchronizing signal PB.V coincides with that of the reference vertical synchronizing signal REF. SYNC. However, during non-normal reproduction, when head 3 is deflected in a direction normal to the longitudinal direction of the record tracks, the reproduced vertical synchronizing signal PB.V has its phase changed from that of the reference vertical synchronizing signal REF. SYNC. For example, when head 3 is advanced by one pitch in the direction normal to the longitudinal direction of a record track, the reproduced vertical synchronizing signal PB.V is advanced in phase by a factor $\beta$ with respect to the reference vertical synchronizing signal REF. SYNC. This phase variation $\Delta\phi$, in addition to the variation $\Delta H$ of the horizontal scanning period, is used to determine the jump condition, as previously described in relation to FIG. 4.

In particular, a phase difference detecting circuit 33 is provided to compare the phase of the reproduced vertical synchronizing signal PB.V with that of the reference vertical synchronizing signal REF. SYNC and to produce an output $\Delta\phi$ in response to such comparison. The reference vertical synchronizing signal REF. SYNC appears at a time corresponding to the head reaching the concluding end of the scanning path, that is, at the point on the track at which a vertical synchronizing signal REC. V is recorded, and may be formed by a rotational phase detector associated with upper rotary drum $1a$. The phase variation $\Delta\phi$ from phase difference detecting circuit 33 and the variation $\Delta H$ in the horizontal scanning period from horizontal frequency detector 27 are supplied to a jump signal forming circuit 31 which produces a jump voltage $V_F$ which is added to the slant compensation voltage $V_{n-1}$ in adder 29. The resultant signal is supplied to an inclination detecting circuit 21 which detects rapid changes in the voltage, that is, corresponding to the jump voltage period, and supplies an output to gate circuit 20 during such time to prevent any signal from being supplied therethrough to multiplier circuit 17, as previously discussed. The resultant signal from adder 29 is also supplied to adder 23 in which the tracking error signal e is added thereto and the combined signal is supplied to an input of an integrating circuit 7 which produces the aforementioned tracking signal E. The tracking signal E, as previously described, is subtracted from the detecting signal b of strain gauge 4 in subtracting circuit 18, and is also added to the dithering signal w in adder 9, the output from adder 9 being supplied to drive circuit 6 for controlling the deflection of bi-morph leaf 2.

However, as previously described, the situation may occur where one or more vertical synchronizing signals PB.V are not reproduced or are incorrectly reproduced, for example, due to tape tension variation or damage to the tape itself. Although, for example, a second equalizing pulse may be substituted therefor in the normal reproducing mode, this pulse cannot be used in the special reproducing modes. Therefore, in accordance with the present invention, a synchronizing signal forming circuit 32 is supplied with the reproduced vertical synchronizing signal PB.V from synchronizing signal separator 12, a signal corresponding to the variation $\Delta H$ in the horizontal scanning period from horizontal frequency detecting circuit 27, and an output signal from jump signal forming circuit 31 to produce a substitute vertical synchronizing signal PB.VX which, rather than the reproduced vertical synchronizing signal PB.V, is compared with the reference vertical synchronizing signal REF. SYNC in phase difference detecting circuit 33. The substitute vertical synchronizing signal PB.VX is in substantial synchronization with the reproduced vertical synchronizing signal PB.V when the latter is accurately reproduced. Thus, the substitute vertical synchronizing signal PB.VX is correctly produced even when the reproduced vertical synchronzing signal PB.V is dropped-out or produced at an earlier or later time.

Figure 6:
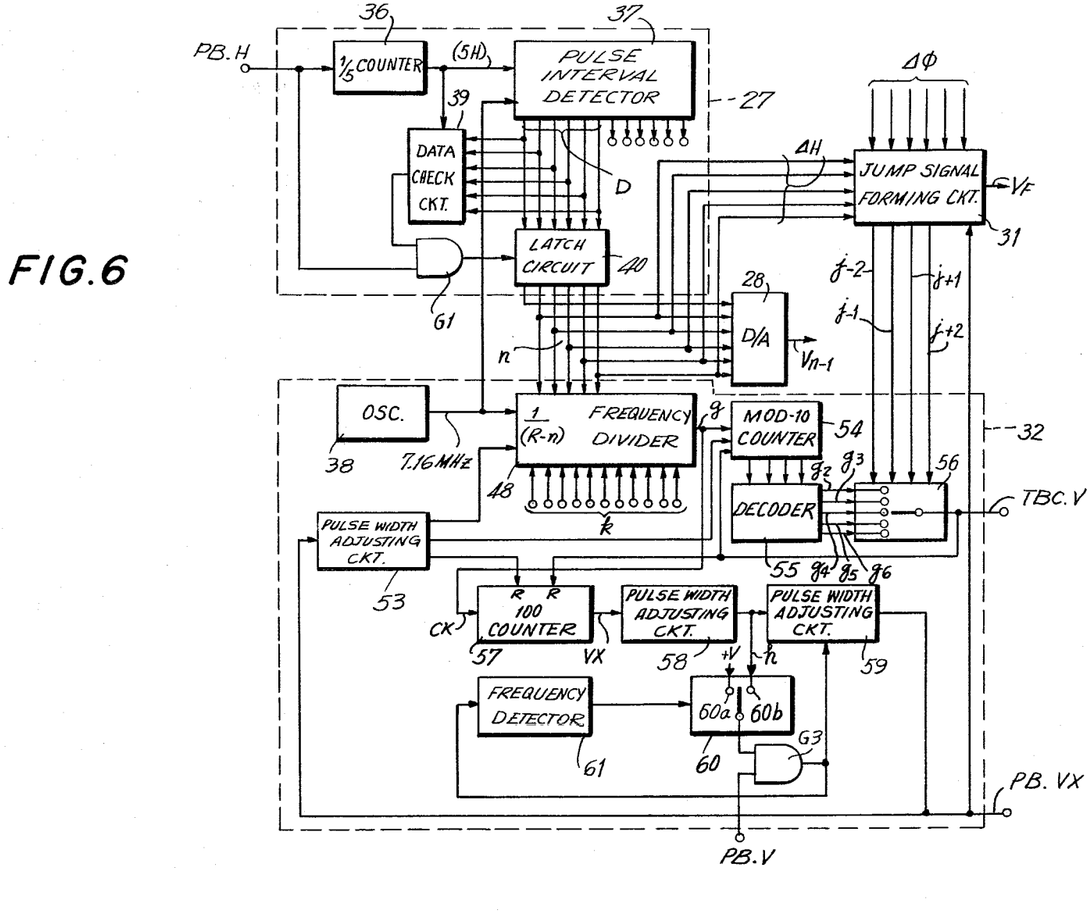
FIG. 6 is a block diagram of a portion of the circuit of FIG. 1, particularly illustrating the horizontal frequency detecting circuit and the synchronizing signal forming circuit therein.

Referring now to FIG. 6, there is shown one embodiment of a horizontl frequency detecting circuit 27 and synchronizing signal forming circuit 32 which can be used in the head tracking control circuit of FIG. 1. As shown therein, horizontal frequency detecting circuit 27 includes a divide-by-five (1/5) counter 36 supplied with the reproduced horizontal synchronizing signal PB.H from synchronizing signal separating circuit 12 and which divides the frequency of such signal by five so as to produce a 5H interval pulse output. The output from counter 36 is supplied to a pulse interval detector 37 which is also supplied with clock pulses from an oscillator 38 having a frequency of 7.16 MHz, that is, of $3\ f_{SC}$, where $f_{SC}$ is the horizontal scanning frequency, and which are used to measure the 5H interval of the output from counter 36. The number of pulses in each 5H interval which can be counted or detected by detector 37 is $455 \times 5 = 2275$, and accordingly, a 12-bit counter is used therefor. The six lowest or least significant bits of the output from detector 37 provide data D corresponding to the tape speed. In order to determine the direction of movement of the tape, detector 37 is originally preset with the number $2275 + 2^5 = 2307$ and thereafter counts down the clock pulses therefrom. Thus, when detector 37 counts 2275 pulses, the value counted down to must be equal to the number 32. If this latter number is not produced, an error has been produced in the system. Accordingly, when all of the six upper or most significant bits of the output from detector 37 are not equal to "0" at such time, the operation of a latch circuit in pulse interval detector 37 is inhibited so as to eliminate any error in the measurement data. It should be appreciated that the dynamic range of the interval measurement is $\pm(32 \div 2275) = \pm 1.4\%$ which corresponds to a tape speed ratio range n of $-0.5$ to $2.5$.

Figure 7:
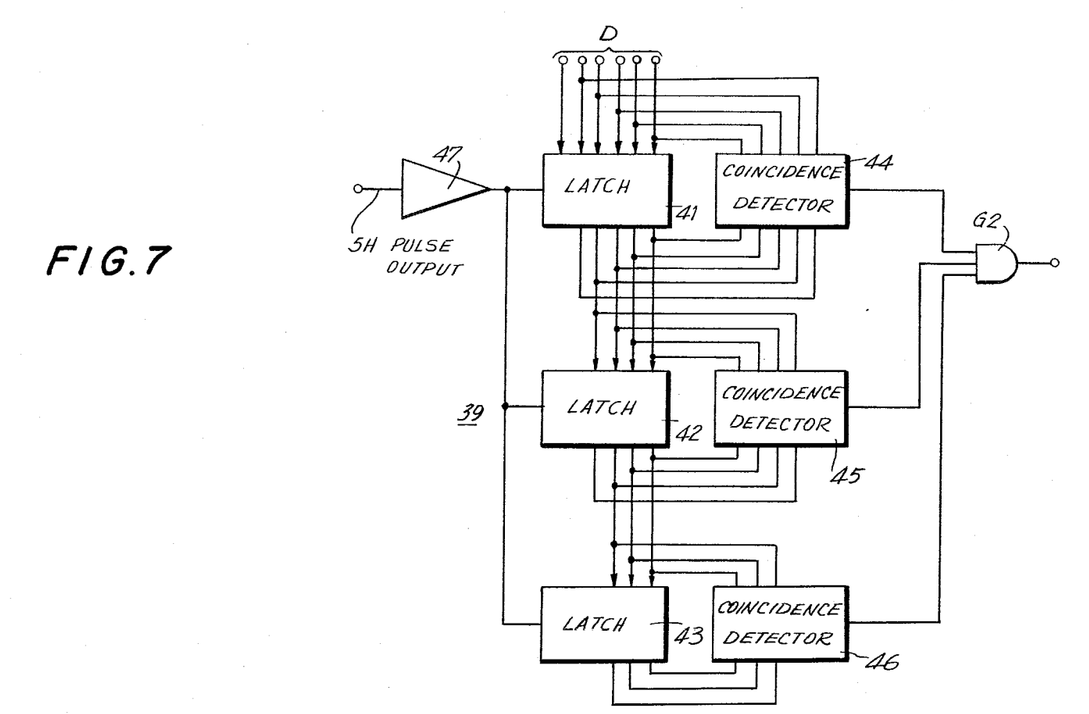
FIG. 7 is a block diagram of one embodiment of a data check circuit for use in the horizontal frequency detecting circuit of FIG. 6.

The data D of the six least significant bits from pulse interval detector 37 is supplied to a data check circuit 39 which generates a logic level "1" when the data D is reliable. In particular, one embodiment of a data check circuit 39 is shown in FIG. 7 to include three latch circuits 41, 42 and 43 and three coincidence detecting circuits 44, 45 and 46. The 5H interval pulse output from counter 36 is supplied as a trigger pulse through an inverter 47 to each latch circuit 41, 42 and 43. Also, the 6-bit data output D from pulse interval detector 37 is supplied to the first latch circuit 41 which produces an output corresponding to the five most significant bits of data output D. The output of latch circuit 41 and the five most significant bits of the data output D, that is, the input to latch circuit 41, are supplied to coincidence detecting circuit 44 for comparison therein. When the output from latch circuit 41 does not coincide with the data output D, coincidence detecting circuit 44 produces a logic level "0" output and, when coincidence does occur, produces a logic level "1" output. In a similar manner, the four most significant bits from the output of latch circuit 41 are supplied to latch circuit 42 which produces an output of 4-bits which is compared with the 4-bit input to latch circuit 42 in coincidence detecting circuit 45. It should be appreciated that two bits from data output D are dropped from the data supplied to latch circuit 42 to lighten the significance of the data check therein, in view of the fact that the data supplied to latch circuit 42 lags the data D supplied to latch circuit 41. Further, the three most significant bits from the output of latch circuit 42 are supplied to latch circuit 43 which produces a 3-bit output which is compared with the 3-bit input in coincidence detecting circuit 46. Thus, in a similar manner to the operation of coincidence detecting circuit 44, coincidence detecting circuits 45 and 46 produce logic level "0" outputs where there is no coincidence between the respective signals supplied thereto. The three outputs of coincidence detecting circuits 44, 45 and 46 are supplied to respective inputs of an AND gate G2 which produces a logic level "1" signal when coincidence is obtained with all of the detecting circuits 44, 45 and 46 so as to indicate that the data is reliable.

The output from data check circuit 39 and, more particularly, from AND gate G2 thereof, is supplied to one input of an AND gate G1 and the reproduced horizontal synchronizing signal PB.H is supplied to the other input thereof. Thus, the output of data check circuit 39 functions to pass the horizontal synchronizing signal PB.H, when the data D is reliable, to the trigger input of a latch circuit 40 which is also supplied with the data D comprised of the six least significant bits from pulse interval detector 37. In this manner, reliable data is obtained from the output of latch circuit 40 which constitutes the output of horizontal frequency detecting circuit 27.

The output from latch circuit 40, which corresponds to the tape speed ratio n, is supplied to D/A converter 28 which, in turn, produces the above-described slant or inclination compensation voltage $V_{n-1}$. In addition, the five most significant bits from the 6-bit data output D of latch circuit 40 are supplied as the horizontal frequency variation signal $\Delta H$ to jump signal forming circuit 31 which is also supplied with a 6-bit phase difference signal $\Delta\phi$ from phase difference detecting circuit 33. In a preferred embodiment, jump signal forming circuit 31 includes four random access memories (ROMs), each having 10-bit inputs, and respective gate circuits. Thus, on the basis of the input data $\Delta H$ and $\Delta\phi$, the flyback or jump voltage $V_F$ for the $-2, -1, 0, +1$ and $+2$ flyback conditions are formed in accordance with the condition determined by equation (10) and FIG. 4.

Figure 8:
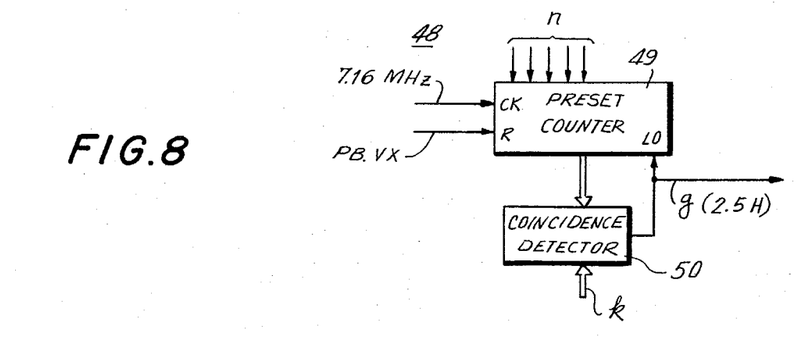
FIG. 8 is a block diagram of one embodiment of a 1/(R-n) frequency divider which can be used in the synchronizing signal forming circuit of FIG. 6.

The synchronizing signal forming circuit 32 is shown to include a $1/(R-n)$ frequency dividing circuit 48 supplied with the five most significant bits of the output from latch circuit 40. In particular, frequency dividing circuit 48 is preferably comprised of a preset counter 49 and a coincidence detecting circuit 50, as shown in FIG. 8. Preset counter 49 includes a clock input terminal CK supplied with clock pulses having a frequency of 7.16 MHz from oscillator 38 and a reset input terminal R supplied with the substitute vertical synchronizing signal PB.VX produced by synchronizing signal forming circuit 32. The five most significant bits of the output from latch circuit 40, corresponding to the tape speed ratio n, are used to preset counter 49. It should be appreciated that, since only the five most significant bits of the output from latch circuit 40 are used, such output is effectively shifted by one bit in the least significant bit direction so as to be divided by 2. It should further be appreciated that the value of the output from latch circuit 40 has a central or zero value of "32" at normal tape speed, while varying within the range of "0" to "64" during the special modes of reproduction. Accordingly, preset counter 49 is preset with the number "16" for the normal reproduction mode. Counter 49 counts from its preset condition in accordance with the clock pulses supplied thereto until a preset signal is supplied to a load input LO thereof to preset counter 49 again with the output of latch circuit 40, that is, with the data corresponding to the tape speed ratio n. Preset counter 49 supplies an output signal in response to the counting operation thereof to detecting circuit 50. As previously discussed, the counted value of counter 49 is equal to 2275 for the 5H interval. A second signal k is supplied to another input of coincidence detecting circuit 50 and is selected to have a value of $2.5H + n/2$ $= 2275/2 + 32/2 \cong 1154$. Thus when the counted value of counter 49 reaches the value of signal k, an output pulse g is produced and supplied to the load input LO of counter 49 to preset the latter with the output of latch circuit 40. In other words, it should be appreciated that the normal value of $(R-n)$ is $2275 \div 2$ so that pulse g has a duration of 2.5 H, that is, corresponding to the distance along any track equal to $\beta$ (FIG. 5), as previously discussed. It should be appreciated, however, that the time interval of pulse g varies in accordance with the output of latch circuit 40, and accordingly, with the tape speed ratio n.

Since pulse g is produced in response to the output from latch circuit 40, which depends only on the reproduced horizontal synchronizing signal PB.H, which is always reproduced, pulse g is always obtained from coincidence detector 50 as the output of frequency dividing circuit 48, irrespective of the reproduced vertical synchronizing signal PB.V. Further, the substitute vertical synchronizing signal PB.VX produced by synchronizing signal forming circuit 32 is supplied through a pulse width adjusting circuit 53 to the reset input terminal R of counter 49 to reset the latter. It should be appreciated that frequency dividing circuit 48 functions as an AFC or PLL circuit to generate pulses having a 2.5 H interval and which are synchronized with the vertical synchronizing signal PB.V when correctly reproduced, regardless of whether such signal is dropped-out or in error.

The output pulse g of frequency dividing circuit 48 is supplied to a mod-10 counter 54 which is also supplied with the output of pulse width adjusting circuit 53 for resetting counter 54 with the substitute vertical synchronizing signal PB.VX, and with the time base corrected vertical synchronizing signal TBC.V from circuit 32, the latter functioning to inhibit the operation of counter 54. Mod-10 counter 54 supplies an output to a decoder circuit 55 which produces parallel output signals $g_2, g_3 \ldots g_6$ having counted values ranging from "2" to "6", respectively. The output signals $g_2, g_3 \ldots g_6$ correspond to positions $5H(2\beta)$, $7.5H(3\beta)$, $10H(4\beta)$, $12.5H(5\beta)$ and $15H(6\beta)$, counted from the starting end of each recorded track, as shown more particularly on track $T_0$ in FIG. 5.

The output signals $g_2$ to $g_6$ of decoder 55 are supplied to a line selector 56 which is also supplied with jump instruction signals $j_{-2}, j_{-1}, j_{+1}$ and $j_{+2}$ from jump signal forming circuit 31. The jump instruction signals are formed together with the aforementioned flyback voltages for $-2, -1, 0, +1$ and $+2$ flyback and are supplied to line selector 56 before or at the same time that the flyback voltages are produced. For example, during the normal reproducing mode, the center pulse $g_4$ (10H) is selected and supplied as a time base corrected vertical synchronizing signal TBC.V to a time base correcting circuit to correct the time base of the output of the VTR. Thus, synchronizing signal TBC.V corresponds to a specified position on the track to be scanned so that the time base correcting circuit processes signals with reference to the correct vertical phase. As another example, in the still reproducing mode, where track $T_0$ in FIG. 5 is repeatedly scanned, the head is positioned at the initial end of track $T_1$ at the end of one scanning operation. Accordingly, $+1$ flyback is performed to deflect the head to the initial end of track $T_0$ so as to scan the same. However, the phase of the reproduced signal from track $T_0$ after such deflection is advanced by a distance $\beta$. Accordingly, output signal g₃ (7.5H) is selected in line selector 56 by jump instruction signal j₊₁, pulse g₃ corresponding to an earlier distance of β(2.5H) in comparison with signal g₄ in the normal reproducing mode. In this manner, the time base corrected vertical synchronizing signal TBC.V is adjusted to correspond to the vertical phase of the reproduced picture in accordance with the track jump. A similar operation is performed for the other special reproducing modes.

It should further be appreciated that the pulses $g_2$ to $g_6$ are frequency modulated by frequency dividing circuit 48 in accordance with the tape speed ratio n. Accordingly, the position of synchronizing signal TBC.V is adjusted to be maintained at a correct position, even though the time base of the reproduced video signal is changed in a special reproducing mode. In this manner, the time base of the reproduced video signal is stably and accurately corrected in a time base correcting circuit (not shown).

The output pulses g of frequency dividing circuit 48 are supplied as clock pulses to a clock input terminal CK of a mod-100 counter 57. Counter 57 is also supplied with the substitute vertical synchronizing signal PB.VX through pulse width adjusting circuit 53 at a first reset input terminal R thereof and with the time base corrected vertical synchronizing signal TBC.V at a second reset input terminal R thereof. Thus, counter 57 counts the output pulses g until it is reset by either the substitute vertical synchronizing signal PB.VX or the time base corrected vertical synchronizing signal TBC.V. This will be seen more particularly as follows. As shown in FIG. 5, when the synchronizing signal TBC.V is selected to correspond to a position on a track of 4β (10H), the vertical synchronizing signal REC.V recorded at the end of that track is located at a position of approximately 101β from the synchronizing signal TBC.V, that is, at a position of 262.5H(=10H+2.5×101) from the start of the track. Thus, counter 57 is reset with the synchronizing signal TBC.V so as to start counting at a position corresponding to 10H on the track. Counter 57 then counts 100 pulses g. Because the output of counter 57 is delayed by a time corresponding to 2.5 H, counter 57 effectively counts 101 intervals of β (2.5H) so that a substitute vertical synchronizing signal PB.VX can accurately be obtained without reproducing the recorded vertical synchronizing signal REC.V at the end of each track. Counter 57 is then reset with the substitute vertical synchronizing signal PB.VX from pulse width adjusting circuit to prevent any erroneous operation of the circuit.

It should be appreciated that the synchronizing signal TBC.V always corresponds to a specified position (10H) on the track regardless of the tape speed and track jump. It should further be appreciated that, even with noise, drop-out or the like in the reproduced video signal, the pulse g and synchronizing signal TBC.V are always produced, and never lost. In this manner, counter 57 always produces a stable pulse VX which can be utilized in place of the reproduced vertical synchronizing signal PB.V, regardless of tape speed and track jump. The output VX is shown in FIG. 9A.

Figure 9:
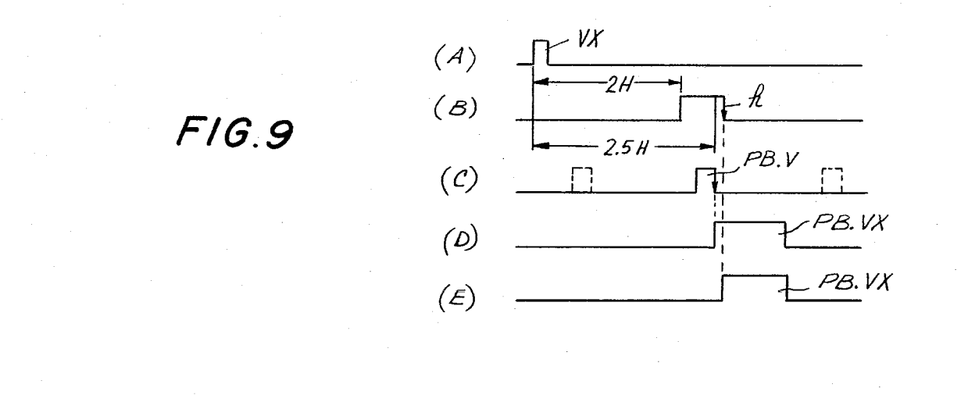
FIGS. 9A-E are waveform diagrams used for explaining the operation of the circuit of FIG. 6.

The output VX from counter 57 is supplied to a pulse width adjusting circuit 58 to obtain a prediction pulse h, as shown in FIG. 9B, in which the leading edge of output VX leads the leading edge of prediction pulse h by a time corresponding to 2H. Pulse h falls at a time 2.5H+α from the output VX where α=0.1H. Pulse h is supplied to a fixed terminal 60b of a data selecting switch 60, with fixed terminal 60b normally being in contact with the movable arm of data selecting switch 60. The output of data selecting switch 60 from the movable arm thereof is supplied to one input of an AND gate G3 and the reproduced vertical synchronizing signal PB.V is supplied to another input of AND gate G3. The relationship between the reproduced vertical synchronizing signal PB.V and pulse h is shown in FIGS. 9B and 9C. It should be appreciated that the phase of the reproduced vertical synchronizing signal PB.V is substantially the same as that of prediction pulse h. When both signals PB.V and h are produced, AND gate G3 supplies a logic level "1" signal to a pulse width adjusting circuit 59 which is also supplied with the output of pulse width adjusting circuit 58. Pulse width adjusting circuit 59 forms the substitute vertical synchronizing signal PB.VX having its leading edge in synchronization with the earlier one of the trailing edges of signals PB.V and h. Since the trailing edge of the reproduced vertical synchronizing signal PB.V falls at an earlier time than that of prediction pulse h, the substitute vertical synchronizing signal PB.VX shown in FIG. 9D is normally obtained from pulse width adjusting circuit 59, as a function of the reproduced vertical synchronizing signal PB.V. Further, when the reproduced vertical synchronizing signal PB.V is supplied to AND gate G3 so that the latter produces a logic level "1" output signal, this latter signal is also supplied to a frequency detecting circuit 61 which is comprised of a retriggerable monostable multivibrator having a time constant, for example, longer than 3V, where V is a vertical time period. Thus, as long as AND gate G3 supplies its logic level "1" signal to frequency detecting circuit 61, the latter circuit operates to maintain the movable arm of data selecting switch 60 in contact with terminal 60b.

When the reproduced vertical synchronizing signal PB.V is dropped-out or is accidentally generated at an early or later time, as shown by the dotted lines in FIG. 9C, due to, for example, track jump, no output signal is produced by AND gate G3. Accordingly, the substitute vertical synchronizing signal PB.VX is formed in synchronization with the trailing edge of prediction pulse h from pulse width adjusting circuits 58, as shown in FIG. 9E. Since the substitute vertical synchronizing signal PB.VX is generated at the position of 101β+α(0.1H), it lags slightly from the dropped-out reproduced vertical synchronizing signal PB.V during each vertical period. However, whenever the signal PB.V is again correctly produced, the phase lag is instantaneously cancelled.

When more than three reproduced vertical synchronizing signals PB.V are dropped-out, frequency detecting circuit 61 is reset to switch the movable arm of data selecting switch 60 to terminal 60a which is supplied with a high level voltage. Accordingly, this high level voltage is supplied to one input terminal of AND gate G3 and the reproduced vertical synchronizing signal PB.V is obtained at the output of gate G3, regardless of its phase relation with prediction pulse h. However, since AND gate G3 again supplies its logic level "1" to frequency detecting circuit 61, the movable arm of data selector switch 60 is again switched over to terminal 60b. Accordingly, when the reproduced vertical synchronizing signal PB.V is again supplied to AND gate G3, the substitute vertical synchronizing signal PB.VX, as shown in FIG. 9D, is formed, as described above. Further, at such time, the substitute vertical synchronizing signal PB.VX, as shown in FIG. 9D, is supplied as the reset signal through pulse width adjusting circuit 53 to frequency dividing circuit 48 and counters 54 and 57 to again obtain the correct phase relation of the vertical synchronizing signal PB.VX.

It should therefore be appreciated that the substitute vertical synchronizing signal PB.VX is always supplied to phase difference detecting circuit 33 even when the reproduced vertical synchronizing signal PB.V is dropped-out or is generated at an early or late time. Thus, the production of the substitute vertical synchronizing signal PB.VX having correct vertical phase results in phase continuity of the vertical synchronizing signal, even during track jump or time base variation in the special reproducing modes. Accordingly, the phase difference signal $\Delta\phi$ is stably obtained from detecting circuit 33 and jump signal forming circuit 31 correctly operates in any special reproducing mode.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for reproducing information signals recorded in successive parallel tracks on a record medium in any of a plurality of different reproducing modes, said information signals including vertical synchronizing signals also recorded on said record medium, said apparatus comprising:
   transducer means movable in a direction along the tracks for reproducing the signals recorded therein;
   transducer deflecting means for deflecting said transducer means in a direction transverse to said direction along the tracks;
   synchronizing signal forming means for producing substitute vertical synchronizing signals having correct vertical phase continuity for each of said plurality of different reproducing modes in response to one of synchronizing pulses and said recorded vertical synchronizing signals, regardless of any phase discontinuity in said recorded vertical synchronizing signals as reproduced; and
   drive signal means for producing a drive signal in response to at least said substitute vertical synchronizing signals and for supplying said drive signal to said transducer deflecting means so as to control the latter to deflect said transducer means to accurately move along said tracks.

2. Apparatus according to claim 1; in which said information signals further include horizontal synchronizing signals also recorded on said record medium; further including means for separating said horizontal synchronizing signals from said information signals; and in which said record medium is advanced at a recording speed in the recording mode of operation and at a reproducing speed in the reproducing mode of operation; said drive signal means includes horizontal frequency detecting means for detecting the speed of advancement of the record medium in the reproducing mode of operation and for producing a speed ratio signal corresponding to the ratio of said reproducing speed to said recording speed in response to said horizontal synchronizing signals; and said synchronizing signal forming means produces said substitute vertical synchronizing signals in response to at least said speed ratio signal of said horizontal frequency detecting means.

3. Apparatus according to claim 2; in which said horizontal frequency detecting means includes counter means for frequency dividing said recorded horizontal synchronizing signals as reproduced, oscillator means for generating an oscillation signal, and detector means for producing said speed ratio signal in response to said oscillation signal and said frequency divided horizontal synchronizing signals.

4. Apparatus according to claim 3; in which said horizontal frequency detecting means further includes latch means supplied with said speed ratio signal from said detector means and data check means for actuating said latch means to supply said speed ratio signal as the output of said horizontal frequency detecting means.

5. Apparatus according to claim 4; in which said data check means includes a first latch circuit supplied with the speed ratio signal from said detecting means and producing a first output latch signal in response thereto, and first coincidence detecting means for comparing said speed ratio signal from said detecting means and said first ouput latch signal and producing a first coincidence signal for actuating said latch means in response to such comparison.

6. Apparatus according to claim 5; in which said data check means includes a second latch circuit supplied with at least a portion of said first output latch signal as a first input signal therefor and producing a second output latch signal in response thereto, second coincidence detecting means for comparing said first input signal and said second output latch signal and producing a second coincidence signal in response to such comparison, a third latch circuit supplied with at least a portion of said second output latch signal as a second input signal therefor and producing a third output latch signal in response thereto, third coincidence detecting means for comparing said second input signal and said third output latch signal and producing a third coincidence signal in response to such comparison, and gate means supplied with said first, second and third coincidence signals for producing a data check signal for actuating said latch means in response to said comparison by said first, second and third coincidence detecting means.

7. Apparatus according to claim 2; in which said synchronizing signal forming means includes oscillator means for generating an oscillation signal, means for continuously producing first pulses having a period equal to a multiple of the period of the reproduced horizontal synchronizing signals in response to said speed ratio signal and said oscillation signal, and counter means for counting said first pulses from a reference time to produce said synchronizing pulses which can be used as the substitute vertical synchronizing signals.

8. Apparatus according to claim 7; in which said means for continuously producing first pulses includes preset counter means adapted to be preset with the speed ratio signal from said horizontal frequency detecting means and having a clock input terminal supplied with said oscillation signal, and coincidence detecting means for comparing a reference signal and the output of said preset counter means and for producing said first pulses in response to said comparison.

9. Apparatus according to claim 8; in which said preset counter means includes a preset input terminal supplied with said first pulses for presetting said preset counter means with the speed ratio signal, and a reset input terminal supplied with said substitute vertical synchronizing signals for resetting said preset counter means.

10. Apparatus according to claim 7; in which said multiple is equal to 2.5 and said counter means includes a mod-100 counter having a clock input terminal which receives said first pulses and a reset input terminal which receives a reference synchronizing signal.

11. Apparatus according to claim 7; in which said synchronizing signal forming means further includes gate means for producing output gate pulses during coincidence of said reproduced vertical synchronizing signals and said synchronizing pulses from said counter means, and pulse width adjusting means supplied with said synchronizing pulses from said counter means and said output gate pulses for producing said substitute vertical synchronizing signals in response thereto, with the leading edges of said substitute vertical synchronizing signals corresponding to the earlier of the trailing edges of said output gate pulses and said synchronizing pulses.

12. Apparatus according to claim 11; in which said synchronizing signal forming means includes switch means adapted to supply one of said synchronizing pulses and a reference signal to said gate means, and detector means for controlling the operation of said switch means in response to said gate means to normally supply said synchronizing pulses to said gate means and to supply said reference signal to said gate means only in the absence of a predetermined number of reproduced vertical synchronizing signals being supplied to said gate means.

13. Apparatus according to claim 7; further including means for producing reference vertical synchronizing signals; and in which said drive signal means includes phase difference detecting means for producing a phase difference signal in response to the difference in phase between said substitute vertical synchronizing signals and said reference vertical synchronizing signals, and jump signal forming means for producing a head jump signal as part of said drive signal and jump instruction signals in response to said speed ratio signal from said horizontal frequency detecting means and said phase difference signal; and said synchronizing signal forming means further includes decoder means for producing a plurality of decoder pulse signals in response to said first pulses, each decoder pulse signal corresponding to a different position from the starting end of each of said tracks, and selector means for selecting one of said decoder pulse signals as a time base corrected vertical synchronizing signal in response to said jump instruction signals.

14. Apparatus according to claim 13; in which said time base corrected vertical synchronizing signal is supplied to said means for continuously producing first pulses and said counter means for resetting the same.

15. Apparatus according to claim 1; in which said information signals further include horizonal synchronizing signals also recorded on said record medium; said record medium is advanced at a recording speed in the recording mode of operation and at a reproducing speed in the reproducing mode of operation; and said drive signal means includes horizontal frequency detecting means for detecting the speed of advancement of the record medium in the reproducing mode of operation and for producing a speed ratio signal corresponding to the ratio of said reproducing speed to said recording speed, and slant compensation means for producing a slant compensation signal as part of said drive signal in response to said speed ratio signal to correct any inclination tracking error by said transducer means.

16. Apparatus according to claim 1; further including means for producing said reference vertical synchronizing signals; and in which said information signals further include horizontal synchronizing signals also recorded on said record medium; said record medium is advanced at a recording speed in the recording mode of operation and at a reproducing speed in the reproducing mode of operation; and said drive signal means includes horizontal frequency detecting means for detecting the speed of advancement of the record medium in the reproducing mode of operation and for producing a speed ratio signal corresponding to the ratio of said reproducing speed to said recording speed, phase difference detecting means for producing a phase difference signal in response to the difference in phase between said substitute vertical synchronizing signals and said reference vertical synchronizing signals, and jump signal forming means for producing a head jump signal as part of said drive signal in response to said phase difference signal and said speed ratio signal to produce a head jump at selected times.

17. Apparatus according to claim 16; in which said drive signal means further includes slant compensation means for producing a slant compensation signal as part of said drive signal in response to said speed ratio signal to correct any inclination tracking error by said transducer means, and first adder means for combining said slant compensation signal and said head jump signal.

18. Apparatus according to claim 17; in which said record medium is a magnetic tape having said tracks extending obliquely thereon, said tape extends helically about at least a portion of the periphery of a guide drum and is adapted to be longitudinally advanced, at least a portion of said guide drum is rotatable, and said transducer means includes a magnetic head mounted by means of said transducer deflecting means on said rotatable portion of the guide drum so as to rotate with the latter and thereby scan along a selected one of the tracks positioned in proximity thereby by advancement of the tape.

19. Apparatus according to claim 17; in which said drive signal means includes deflection signal generating means for generating a deflection signal in correspondence to the deflection of said transducer means in said transverse direction from a rest position, subtraction means for removing from said deflection signal any components of the latter due to at least said head jump signal and said slant compensation signal to produce a subtracted deflection signal, oscillating means for providing a dither oscillation signal as part of said drive signal which, on application to said transducer deflection means, causes said transducer means to oscillate in said transverse direction about a null position, envelope detecting means for detecting the envelope of the output of said transducer means as the latter moves along a track and oscillates in said transverse direction, and means for synchronously demodulating the detected envelope from said envelope detecting means by means of said subtracted deflection signal so as to obtain a tracking error signal as part of the drive signal which is representative of the deviation of said null position of the transducer means from the center of the track considered in said transverse direction.

20. Apparatus according to claim 19; in which said means for synchronously demodulating said detected envelope from said envelope detecting means includes multiplier means having inputs receiving said detected envelope from the envelope detecting means and said subtracted deflection signal, respectively.

21. Apparatus according to claim 19; in which said drive signal means includes second adder means (23) for combining said tracking error signal, and said combined slant compensation signal and head jump signal to produce a tracking signal, and said subtraction means functions to subtract said tracking signal from said deflection signal to produce said subtracted deflection signal.

22. Apparatus according to claim 21; in which said drive signal means includes gate means for supplying said subtracted deflection signal to said means for synchronously demodulating, and inclination detecting means for inhibiting said gate means from supplying said subtracted deflection signal to said means for synchronously demodulating during a head jump operation in response to at least said head jump signal.

23. Apparatus according to claim 21; in which said oscillating means produces said dither oscillation signal in response to said subtracted deflection signal, and said drive signal means includes third adder means for combining said tracking signal and said dither oscillation signal.

24. Apparatus according to claim 19; in which said transducer deflecting means is constituted by a bi-morph leaf which is cantilevered at one end and has said transducer means secured to the other end of said leaf, and said drive signal is applied to said bi-morph leaf for flexing the same and thereby causing the deflection in said transverse direction.

25. Apparatus according to claim 24; in which said deflection signal generating means includes a strain gauge secured on said bi-morph leaf so as to be stressed in accordance with the flexing of said leaf.

* * * * *